(12) United States Patent
Nong

(10) Patent No.: US 8,432,927 B2
(45) Date of Patent: Apr. 30, 2013

(54) SCALABLE TWO-STAGE VIRTUAL OUTPUT QUEUING SWITCH AND METHOD OF OPERATION

(75) Inventor: Ge Nong, Hong Kong (CN)

(73) Assignee: STMicroelectronics Ltd., Kowloon (HK)

( * ) Notice: Subject to any disclaimer, the term of this patent is extended or adjusted under 35 U.S.C. 154(b) by 1573 days.

(21) Appl. No.: 10/036,809

(22) Filed: Dec. 31, 2001

(65) Prior Publication Data
US 2003/0123469 A1    Jul. 3, 2003

(51) Int. Cl.
*H04L 12/56*     (2006.01)
(52) U.S. Cl.
USPC .................. 370/413; 370/391; 370/422
(58) Field of Classification Search ............ None
See application file for complete search history.

(56) References Cited

U.S. PATENT DOCUMENTS

| | | | | |
|---|---|---|---|---|
| 5,361,255 A | * | 11/1994 | Diaz et al. ............. | 370/374 |
| 5,821,875 A | * | 10/1998 | Lee et al. ............. | 340/2.21 |
| 6,125,112 A | * | 9/2000 | Koning et al. .......... | 370/388 |
| 6,563,837 B2 | * | 5/2003 | Krishna et al. ......... | 370/413 |
| 2002/0075883 A1 | * | 6/2002 | Dell et al. ............. | 370/413 |
| 2002/0085545 A1 | * | 7/2002 | Ku et al. .............. | 370/369 |

* cited by examiner

*Primary Examiner* — Kevin C Harper
*Assistant Examiner* — Rhonda Murphy
(74) *Attorney, Agent, or Firm* — Munck Wilson Mandala, LLP

(57) ABSTRACT

A fixed-size data packet switch comprising: 1) N input ports for receiving incoming fixed-size data packets at a first data rate and outputting the fixed-size data packets at the first data rate; 2) N output ports for receiving fixed-size data packets at the first data rate and outputting the fixed-size data packets at the first data rate; and 3) a switch fabric interconnecting the N input ports and the N output ports. The switch fabric comprises: a) N input buffers for receiving incoming fixed-size data packets at the first data rate and outputting the fixed-size data packets at a second data rate equal to at least twice the first data rate; b) N output buffers for receiving fixed-size data packets at the second data rate and outputting the fixed-size data packets at the first data rate; and c) a bufferless, non-blocking interconnecting network for receiving from the N input buffers the fixed-size data packets at the second data rate and transferring the fixed-size data packets to the N output buffers at the second data rate.

20 Claims, 3 Drawing Sheets

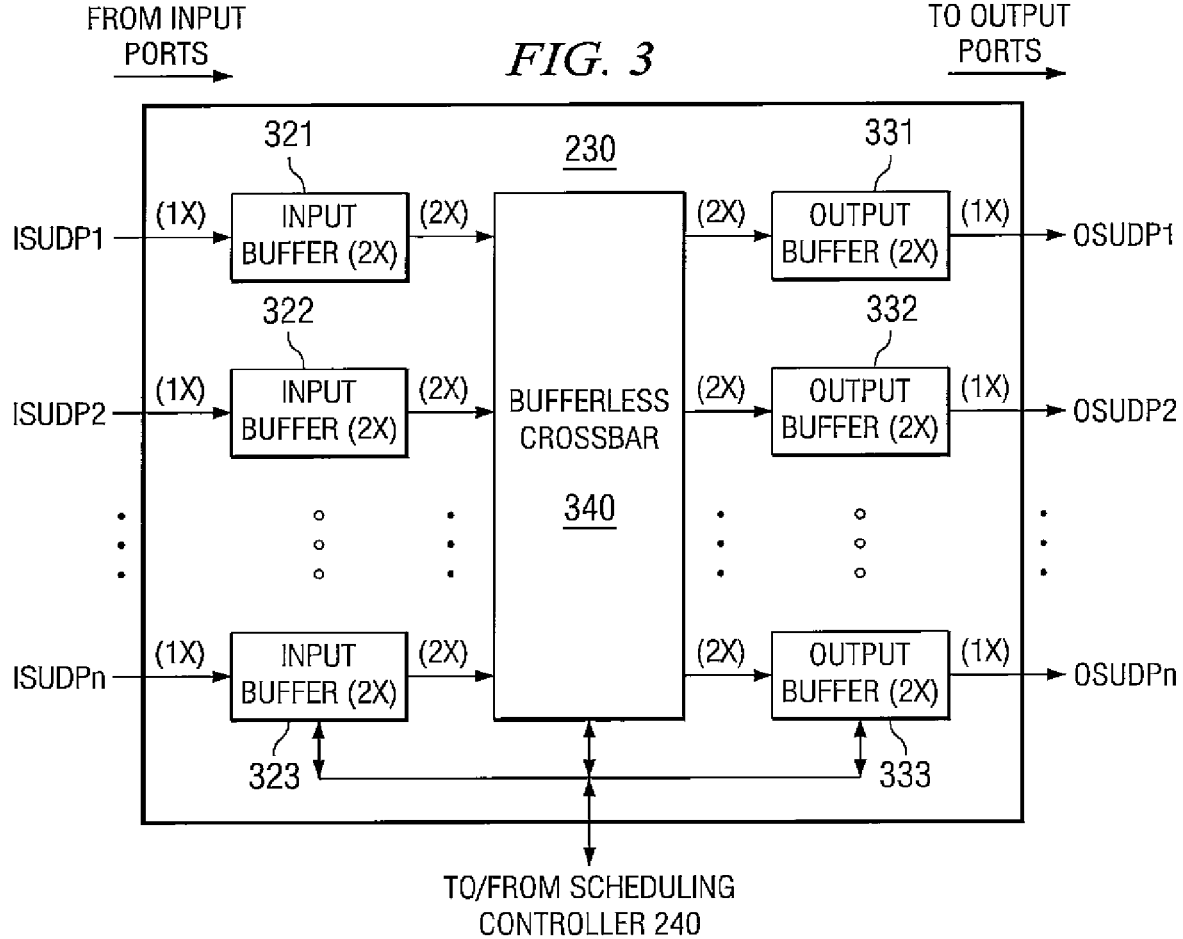

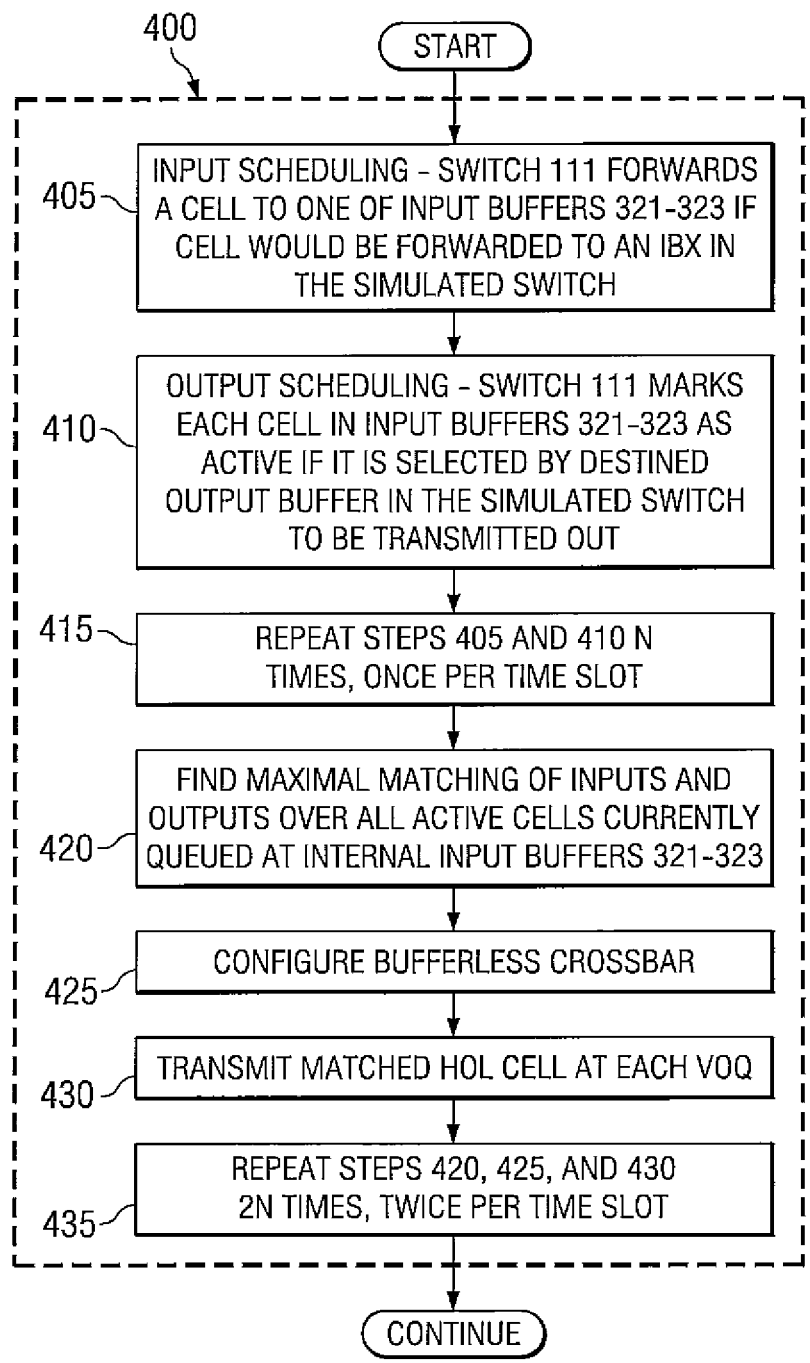

SCALABLE TWO-STAGE VIRTUAL OUTPUT QUEUING SWITCH AND METHOD OF OPERATION

CROSS-REFERENCE TO RELATED APPLICATIONS

The present invention is related to those disclosed in U.S. patent application Ser. No. 10/036,807, filed concurrently herewith, and issued as U.S. Pat. No. 7,154,885 on Dec. 26, 2006, entitled "APPARATUS FOR SWITCHING DATA IN HIGH-SPEED NETWORKS AND METHOD OF OPERATION". U.S. Pat. No. 7,154,885 is commonly assigned to the assignee of the present invention. The disclosure of the related patent application is hereby incorporated by reference for all purposes as if fully set forth herein.

TECHNICAL FIELD OF THE INVENTION

The present invention is generally directed to packet switching networks and, more specifically, to a switch having a bufferless, non-blocking interconnecting network and internal speed-up buffers.

BACKGROUND OF THE INVENTION

Packet switching involves the transmission of data in packets through a data network. Fixed sized packets are referred to as cells. Each block of end-user data that is to be transmitted is divided into cells. A unique identifier, a sequence number and a destination address are attached to each cell. The cells are independent and may traverse the data network by different routes. The cells may incur different levels of propagation delay, or latency, caused by physical paths of different length. The cells may be held for varying amounts of delay time in buffers in intermediate switches in the network. The cells also may be switched through different numbers of packet switches as the cells traverse the network, and the switches may have unequal processing delays caused by error detection and correction.

Historically, a bufferless crossbar has been used as the switching fabric of a virtual output queue (VOQ) switch, which suffers from the scheduling bottleneck that limits the switch's scalability. It has been shown that the scheduling bottleneck can be overcome by replacing the bufferless crossbar with an internally buffered crossbar (IBX), where a small size buffer is located at each crosspoint of the internally buffered crossbar (VOQ+IBX). Specifically, it has been shown that for each internal buffer, a size as small as two cells (or packets) can bring at least two benefits: (1) the ability to perform the scheduling task by each input/output arbiter independently; and (2) the ability to achieve a theoretically guaranteed 100% throughput under any admissible traffic load, with each input or output having an arbitration complexity of $O(\log N)$ per time slot, for an $N \times N$ switch.

However, as the switch size grows, the number of internal buffers increases quadratically, resulting in greater difficulties in the implementation of the buffered crossbar. Thus, the physical scalability of a buffered crossbar using current silicon technology is limited. Therefore, there is a need in the art for improved fixed-sized packet switches. In particular, there is a need for a highly scalable switch architecture having a bufferless, non-blocking interconnecting network between the input ports and the output ports of the switch. More particularly, there is a need for a switch that does not require the use of a crossbar containing internal buffers.

SUMMARY OF THE INVENTION

The present invention comprises a novel switch architecture capable of achieving performances similar to a virtual output queue with internally buffered crossbar (VOQ+IBX) switch, but without the need of an internal buffer at each crosspoint of the switching fabric. A novel scalable virtual output queue and combined input and output queuing (VOQ+CIOQ) switch architecture achieves the optimal balance between the advantages and disadvantages of a speed-up of two combined input and output queuing (CIOQ) switches and a buffered crossbar virtual-output-queue (VOQ) switches.

To address the above-discussed deficiencies of the prior art, it is a primary object of the present invention to provide a fixed-size data packet switch. According to an advantageous embodiment of the present invention, the fixed-size data packet switch comprises: 1) N input ports capable of receiving incoming fixed-size data packets at a first data rate and outputting the fixed-size data packets at the first data rate; 2) N output ports capable of receiving fixed-size data packets at the first data rate and outputting the fixed-size data packets at the first data rate; and 3) a switch fabric interconnecting the N input ports and the N output ports. The switch fabric comprises: a) N input buffers capable of receiving incoming fixed-size data packets at the first data rate and outputting the fixed-size data packets at a second data rate equal to at least twice the first data rate; b) N output buffers capable of receiving fixed-size data packets at the second data rate and outputting the fixed-size data packets at the first data rate; and c) a bufferless, non-blocking interconnecting network that receives from the N input buffers the fixed-size data packets at the second data rate and transferring the fixed-size data packets to the N output buffers at the second data rate.

According to one embodiment of the present invention, the bufferless, non-blocking interconnecting network comprises a bufferless crossbar.

According to another embodiment of the present invention, each of the N input buffers is at least twice the size of each of the N output buffers.

According to still another embodiment of the present invention, the fixed-size data packet switch further comprises a scheduling controller capable of scheduling transfer of the fixed-size data packets from the N input ports to the switch fabric.

According to yet another embodiment of the present invention, the scheduling controller is capable of scheduling transfer of the fixed-size data packets from the N output ports to an external device.

According to a further embodiment of the present invention, the scheduling controller is capable of scheduling transfer of the fixed-size data packets from the N input buffers to the bufferless, non-blocking interconnecting network.

According to a still further embodiment of the present invention, the scheduling controller is capable of scheduling transfer of the fixed-size data packets from the N output buffers to the N output ports.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation;" the term "or," is inclusive, meaning "and/or;" the phrases "associated with" and "associated therewith," as well as derivatives thereof, may mean "include," "be included within," "interconnect with," "contain," "be contained within," "connect to or with", "couple to or with," "be communicable with," "cooperate with," "interleave," "juxtapose," "be proximate to," "be bound to or with," "have," "have a property all of," or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 illustrates in greater detail selected portions of the switching fabric in the exemplary packet switch according to one embodiment of the present invention; and FIG. 4 is a flow chart illustrating the operation of the exemplary packet switch according to one embodiment of the present invention.

DETAILED DESCRIPTION OF THE INVENTION

FIGS. 1 through 4, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged fixed-size packet data switch.

Figure 1:
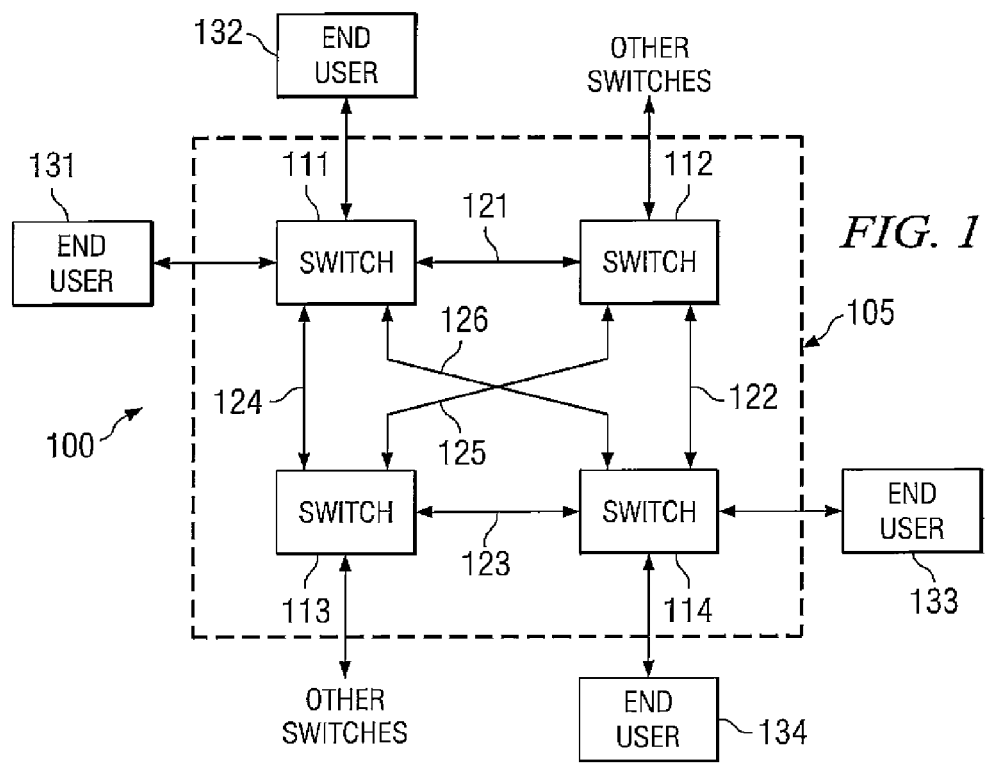
FIG. 1 illustrates an exemplary packet switching network containing packet switches in accordance with the principles of the present invention.

FIG. 1 illustrates an exemplary packet switching network 100 containing packet switches 111-114 in accordance with the principles of the present invention. Packet switching network 100 contains a subnetwork 105, indicated by a dotted line, comprising packet switches 111-114, that interconnects end-user devices 131-134 with each other and with other switches (not shown) and other end-user devices (not shown) associated with packet switching network 100. Packet switches 111-114 are interconnected by data links 121-126. Subnetwork 105 is intended to be a representative portion of packet switching network 100, which may contain many other redundant packet switches similar to packet switches 111-114.

End-user devices 131-134 each may comprise any commonly known processing device, such as a telephone, a personal computer (PC), a fax machine, an office LAN, a network server, or the like, that may communicate via a packet switching network. For example, end-user 131 may comprise a remote network server that is sending a data file to end-user 133, which is a desktop PC. The data file that is to be transmitted is segmented into fixed-size data packets (or cells) in end-user 131. An identifier for the data transfer is appended to each data cell. A sequence number is also appended to each data cell, as is a destination address associated with end-user 133.

Next, the data cells are transferred to packet switch 111. Packet switch 111 may transfer the data cells to end-user 133 by several physical paths. For example, packet switch 111 may send the data cells directly to packet switch 114 across data link 126. If the data traffic load on data link 126 is heavy, packet switch 111 may send some or all of the data cells indirectly to packet switch 114 via data link 121, packet switch 112, and data link 122. Alternatively, packet switch 111 may send some or all of the data cells indirectly to packet switch 114 via data link 124, packet switch 113, and data link 123. Packet switch 114 transfers the data cells to end user device 133, which uses the identifier information and the sequence numbers from each data cell to reassemble the original data file sent by end-user device 131.

Figure 2:
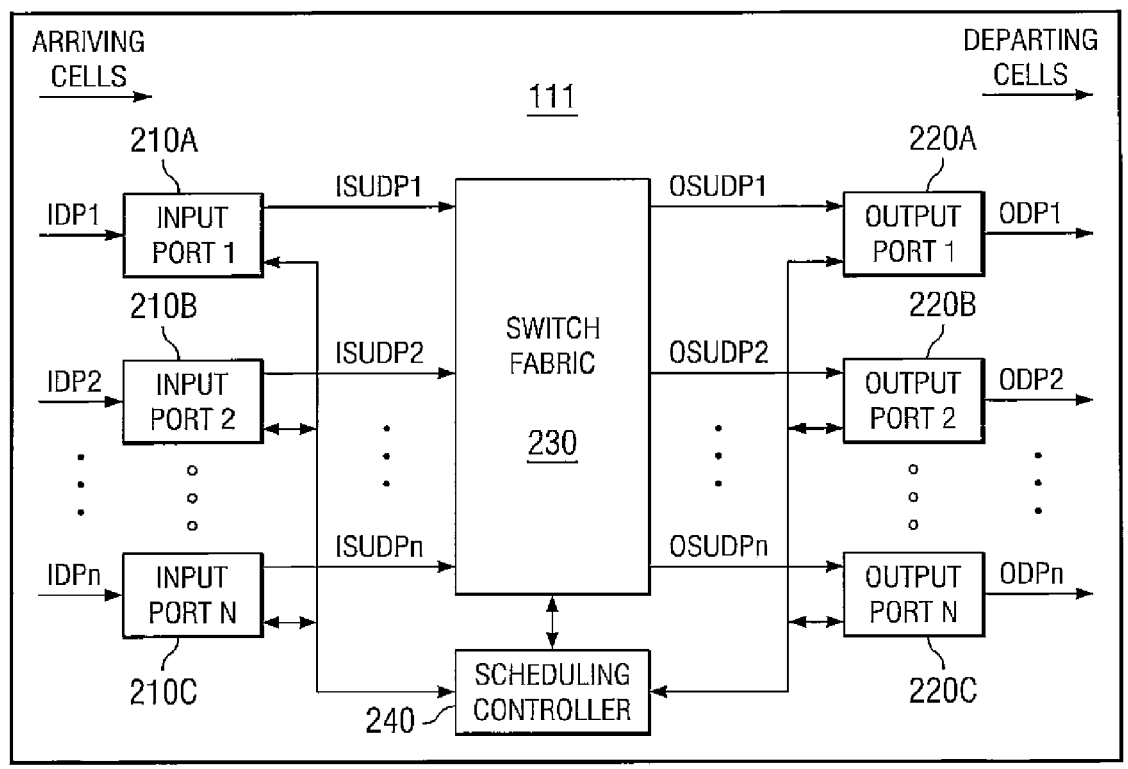
FIG. 2 illustrates in greater detail selected portions of an exemplary packet switch in FIG. 1 according to one embodiment of the present invention.

FIG. 2 illustrates in greater detail selected portions of exemplary packet switch 111 according to one embodiment of the present invention. Packet switch 111 comprises N input ports 210, N output ports 220, switch fabric 230, and scheduling controller 240. N input ports 210 include exemplary input ports 210A, 210B, and 210C, which are arbitrarily labeled Input Port 1, Input Port 2, and Input Port N, respectively. N output ports 220 include exemplary output ports 220A, 220B, and 220C, which are arbitrarily labeled Output Port 1, Output Port 2, and Output Port N, respectively.

Cells arrive on N input data paths, including exemplary input data path 1 (IDP1), input data path 2 (IDP2), and input data path N (IDPn), and are buffered in the N input ports 210. The buffered cells are transferred under the control of scheduling controller 240 to switch fabric 230 over N input speed-up data paths, including exemplary input speed-up data path 1 (ISUDP1), input speed-up data path 2 (ISUDP2), and input speed-up data path N (ISUDPn). The switched cells are transferred under the control of scheduling controller 240 from switch fabric 230 to N output ports 220 over N output speed-up data paths, including exemplary output speed-up data path 1 (OSUDP1), output speed-up data path 2 (OSUDP2), and output speed-up data path N (OSUDPn).

As noted above, the present invention comprises a novel switch architecture that achieves performances similar to a virtual output queue with an internally buffered crossbar (VOQ+IBX) switch, but without the need of an internal buffer at each crosspoint of the switching fabric. Accordingly, switch fabric 230 is a bufferless, non-blocking interconnecting network with internal speed-up buffers that provides a novel scalable architecture. In an exemplary embodiment, switch fabric 230 is a bufferless crossbar that operates with small, speed-up-of-two input and output buffers to achieve the performance of a buffered crossbar without using an internal buffer at each crosspoint of the switching fabric.

FIG. 3 illustrates in greater detail selected portions of switching fabric 230 in exemplary packet switch 111 according to one embodiment of the present invention. Switching fabric 230 comprises N internal speed-up-of-two input buffers (2×), bufferless crossbar 340, and N internal speed-up-two output buffers (2×). The N internal speed-up-of-two input buffers include exemplary input buffers 321, 322 and 323. The N internal speed-up-of-two output buffers include exemplary output buffers 331, 332, and 333.

Cells arrive from the input ports at a speed of 1× (e.g., 10 Mbps) on N input speed-up data paths, including ISUDP1, ISUDP2, and ISUDPn, and are buffered in input buffers 321-323. The buffered cells are transferred at a higher speed of 2× (e.g., 20 Mbps) under the control of scheduling controller 240 to bufferless crossbar 340 over N input speed-up-of-two data paths. The switched cells are transferred under the control of scheduling controller 240 from bufferless crossbar 340 to N output buffers at a speed of 2× over N output speed-up-of-two data paths. Finally, the buffered cells are transferred under the control of scheduling controller 240 from the N output buffers to the N output ports at a speed of 1× over N output speed-up data paths, including OSUDP1, OSUDP2, and OSUDPm.

The present invention emulates a buffered crossbar by a combined input and output queue (CIOQ) switch where each input/output buffer operates in an internal speed-up of two and a bufferless non-blocking interconnecting network, such as bufferless crossbar 340, is used as the switching fabric. As noted, there are two kinds of buffers in switch 111: the speed-up of one buffers (i.e., input ports 210), used as external input buffers, and the speed-up of two buffers, used as internal input buffers 321-323 and as internal output buffers 331-333.

The speed-up-of-one (1×) input buffers (i.e., input ports 210) provide buffers for queuing cells, whereas the speed-up-of-two (2×) input and output buffers enable the emulation of a buffered crossbar. The size requirements for each speed-up of two input and output buffer are 2N and N cells, respectively. The input buffer at each input port generally requires a large space and must be located outside the speed-up of two switching fabric. Queuing at each external/internal input buffer is a virtual output queue (VOQ) where cells/packets are queued according to their destined output ports, and at each internal output buffer may be, for example, a first-in, first-out (FIFO) register.

The proposed switch architecture is optimal in the sense that it inherits two distinct advantages exclusively held by the VOQ switches with either a bufferless or buffered crossbar as the switching fabric, i.e., the low individual buffer bandwidth requirement of the former and the good achievable performances of the latter.

Scheduling by scheduling controller 240 consists of two tasks: 1) scheduling the forwarding of cells from the N external input buffers (i.e., input ports 210) to the internal input buffers (i.e., input buffers 321-323); and (2) scheduling the switching of cells in internal input buffers 321-323 to internal output buffers 331-333. In principle, the CIOQ is controlled by the scheduling controller 240 to simulate an internally buffered crossbar (IBX). It is not required to be an exact simulation, but the delay discrepancy is tightly upper bounded by 2N slots. This can be done because, in a VOQ+IBX switch, there are at most T cells transmitted or received by an input or output port over any time interval of T slots.

FIG. 4 depicts flow chart 400, which illustrates the operation of exemplary packet switch 111 according to one embodiment of the present invention. During input scheduling, a cell is forwarded to the corresponding one of internal input buffers 321-323 if it would be forwarded to the an internally buffered crossbar (IBX) in the simulated switch (process step 405). During output scheduling, each cell is marked at its internal input buffer in the CIOQ as being active if it is selected by its destined output in the simulated switch to be transmitted out (process step 410). Switch 111 repeats steps 405 and 410 N times, once per time slot (process step 415). Next, switch 111 finds a maximal matching of inputs and outputs over all active cells currently queued at the internal input buffers of the CIOQ (process step 420). Switch 111 then configures bufferless crossbar 340 according to the current matching (process step 425) and transmits the matched head of line (HOL) cell at each VOQ (process step 430). Switch 111 then repeats step 420, 425 and 430 2N times, twice per time slot (i.e., speed-up of two) (process step 435).

In the above algorithm, steps 405, 410, and 415 are pipelined with steps 420, 425, 430 and 435 in a cycle period of N slots. A maximum size matching or a stable matching can be used instead at step 420, resulting in a slowdown of step 435 from the speed-up of two to the speed-up of one, or an exact emulation of a VOQ+IBX switch, respectively. However, finding a maximum size matching or a stable matching are generally prohibited, in practice, because of their large complexities of $O(N^{2.5})$ and $\omega(N^2)$, respectively.

It is not difficult to see that the space requirements for each internal input and output buffer are 2N and N. In the internal input buffer, there are, in a cycle of N time slots, at most N new arriving cells at one of internal buffers 321-333. Additionally, there may be at most N cells that have already been queued at the buffer at the beginning of this cycle. As a result, at most 2N cells are needed per internal input buffer.

In the internal output buffer, there are, in a cycle of N time slots, at most N arriving cells, coming at a rate of at most two per single time slot. In addition, there are at most N/2 cells queuing at an internal output buffer at the beginning of a cycle. Therefore, N cells are enough for each internal output buffer. Since the switch performance (in terms of delay, jitter, throughput, fairness and the like) is handled by the emulation of a VOQ+IBX switch performed by steps 405, 410, and 415, the maximal matching algorithm can be implemented in any way that could be very hardware simple. Generally, finding a maximal matching requires a centralized process with a worst case iteration number of N and a complexity of $O(N^2)$.

Although the present invention has been described in detail, those skilled in the art should understand that they can make various changes, substitutions and alterations herein without departing from the spirit and scope of the invention in its broadest form.

What is claimed is:

1. A switch comprising:
  input buffers internal to a switch fabric, the input buffers configured to:
    receive, from external input buffers that are external to the switch fabric, fixed-size data packets at a first data rate, and
    output the fixed-size data packets at a second data rate, the second data rate at least twice the first data rate;
  output buffers internal to the switch fabric, the output buffers configured to:
    receive the fixed-size data packets at the said second data rate, and
    output, to an external output buffer external to the switch fabric, the fixed-size data packets at the first data rate;
  a bufferless, non-blocking interconnecting network configured to transfer the fixed-size data packets from the input buffers to the output buffers;
  a scheduling controller configured to:
    schedule a transfer of fixed-size data packets from the external input buffers to the input buffers, determine a maximal matching of input buffers to output buffers for all the fixed-size data packets that are currently queued at the input buffers, schedule a transfer, based on the determination, of the fixed-size data packets in the input buffers to the output buffers through the bufferless, non-blocking interconnecting network, the transfer identifying a matched head of line of the fixed-size data packets, and schedule the transfer of fixed-size data packets from the switch fabric to the external output buffer; and wherein the input buffers, output buffers, and bufferless, non-blocking interconnecting network emulate a buffered crossbar.

2. The switch fabric of claim 1, wherein said bufferless, non-blocking interconnecting network comprises a bufferless crossbar.

3. The switch fabric of claim 2, wherein each of the input buffers is at least twice the size of each of the output buffers.

4. The switch fabric of claim 1, wherein each of the input buffers is at least twice the size of each of the output buffers.

5. A method of operating a switch, the method comprising:
storing, at external input buffers that are external to the switch fabric, fixed-size data packets; a scheduling controller for:
scheduling a transfer of the fixed-size data packets from the external input buffers to input buffers, the input buffers internal to a switch fabric, and the transfer occurring at a first data rate;
scheduling a transfer of the fixed-size data packets from the input buffers to output buffers through a bufferless, non-blocking interconnecting network, the output buffers internal to a switch fabric, the transfer occurring at a second data rate, the second data rate at least twice the first data rate, the scheduling based on a maximal matching determination of input buffers to output buffers for all fixed-size data packets that are currently queued at the input buffers, and the transfer identifying a matched head of line of the fixed-size data packets;
scheduling the transfer of fixed-size data packets from the switch fabric to an external output buffer; and
wherein the input buffers, output buffers, and bufferless, non-blocking interconnecting network emulate a buffered crossbar.

6. The method fabric of claim 5, wherein said bufferless, non-blocking interconnecting network comprises a bufferless crossbar.

7. The method fabric of claim 6, wherein each of the input buffers is at least twice the size of each of the output buffers.

8. The method fabric of claim 5, wherein each of the input buffers is at least twice the size of each of the output buffers.

9. A fixed-size data packet switch comprising:
external input buffers that are external to a switch fabric;
external output buffers that are external to the switch fabric;
input buffers internal to a switch fabric, the input buffers configured to:
receive, from the external input buffers, fixed-size data packets at a first data rate, and
output the fixed-size data packets at a second data rate, the second data rate at least twice the first data rate;
output buffers internal to the switch fabric, the output buffers configured to:
receive the fixed-size data packets at the second data rate, and
output, to the external output buffer, the fixed-size data packets at the first data rate;

a bufferless, non-blocking interconnecting network configured to transfer the fixed-size data packets from the input buffers to the output buffers;
a scheduling controller configured to:
schedule a transfer of the fixed-size data packets from the external input buffers to the input buffers,
determine a maximal matching of input buffers to output buffers for all the fixed data packets that are currently queued at the input buffers,
schedule a transfer, based on the determination, of the fixed data packets in the input buffers to the output buffers through the bufferless, non-blocking interconnecting network, the transfer identifying a matched head of line of the fixed-size data packets, and
schedule the transfer of the fixed-size data packets from the switch fabric to the external output buffer; and
wherein the input buffers, output buffers, and bufferless, non-blocking interconnecting network emulate a buffered crossbar.

10. The switch of claim 9, wherein said bufferless, non-blocking interconnecting network comprises a bufferless crossbar.

11. The switch of claim 9, wherein each of the input buffers is at least twice the size of each of the output buffers.

12. A switch comprising:
input buffers internal to a switch fabric, the input buffers configured to:
receive, from external input buffers that are external to the switch fabric, fixed-size data packets at a first data rate, and
output the fixed-size data packets at a second data rate, the second data rate at least twice the first data rate;
output buffers internal to the switch fabric, the output buffers configured to:
receive the fixed-size data packets at the said second data rate, and
output, to an external output buffer external to the switch fabric, the fixed-size data packets at the first data rate;
a bufferless, non-blocking interconnecting network configured to transfer the fixed-size data packets from the input buffers to the output buffers;
a scheduling controller configured to:
schedule a transfer of fixed-size data packets from the external input buffers to the input buffers,
determine a maximal matching of input buffers to output buffers for all the fixed-size data packets that are currently queued at the input buffers,
schedule a transfer, based on the determination, of the fixed-size data packets in the input buffers to the output buffers through the bufferless, non-blocking interconnecting network, the transfer identifying a matched head of line of the fixed-size data packets,
schedule the transfer of the fixed-size data packets from the external input buffer to the input buffer once per time slot, and
schedule the transfer, based on the determination, of the fixed-size data packets in the input buffer to the output buffer through a bufferless, non-blocking interconnecting network twice per time slot; and
wherein the input buffers, output buffers, and bufferless, non-blocking interconnecting network emulate a buffered crossbar.

13. The switch of claim 12, wherein the scheduling controller is further configured to:
schedule the transfer of the fixed-size data packets from the switch fabric to the external output buffer.

14. The switch of claim 12, wherein each of the input buffers is at least twice the size of each of the output buffers.

15. A method of operating a switch, the method comprising:
 storing, at external input buffers that are external to the switch fabric, fixed-size data packets; a scheduling controller for:
 scheduling a transfer of the fixed-size data packets from the external input buffers to input buffers, the input buffers internal to a switch fabric, and the transfer occurring at a first data rate;
 scheduling a transfer of the fixed-size data packets from the input buffers to ouput buffers through a bufferless, non-blocking interconnecting network, the output buffers internal to a switch fabric, the transfer occurring at a second data rate, the second data rate at least twice the first data rate, the scheduling based on a maximal matching determination of input buffers to output buffers for all fixed-size data packets that are currently queued at the input buffers, and the transfer identifying a matched head of line of the fixed-size data packets;
 wherein the scheduling of the transfer of fixed-size data packets from the external input buffer to the input buffer is carried out once per time slot;
 wherein the scheduling of the transfer, based on the determination, of fixed-size data packets in the input buffer to the output buffer through a bufferless, non-blocking interconnecting network is carried out twice per time slot; and
 wherein the input buffers, output buffers, and bufferless, non-blocking interconnecting network emulate a buffered crossbar.

16. The method of claim 15, further comprising:
 scheduling the transfer of fixed-size data packets from the switch fabric to the external output buffer.

17. The method of claim 15, wherein each of the input buffers is at least twice the size of each of the output buffers.

18. A fixed-size data packet switch comprising:
 external input buffers that are external to a switch fabric;
 external output buffers that are external to the switch fabric;
 input buffers internal to a switch fabric, the input buffers configured to:
  receive, from the external input buffers, fixed-size data packets at a first data rate, and
  output the fixed-size data packets at a second data rate, the second data rate at least twice the first data rate;
 output buffers internal to the switch fabric, the output buffers configured to:
  receive the fixed-size data packets at the second data rate, and
  output, to the external output buffer, the fixed-size data packets at the first data rate;
 a bufferless, non-blocking interconnecting network configured to transfer the fixed-size data packets from the input buffers to the output buffers;
 a scheduling controller configured to:
  schedule a transfer of the fixed-size data packets from the external input buffers to the input buffers,
  determine a maximal matching of input buffers to output buffers for all the fixed data packets that are currently queued at the input buffers,
  schedule a transfer, based on the determination, of the fixed data packets in the input buffers to the output buffers through the bufferless, non-blocking interconnecting network, the transfer identifying a matched head of line of the fixed-size data packets, and
  schedule the transfer of the fixed-size data packets from the external input buffer to the internal input buffer once per time slot, and
  schedule the transfer, based the determination, of the fixed-size data packets in the input buffer to the output buffer through a bufferless, non-blocking interconnecting network twice per time slot; and
 wherein the input buffers, output buffers, and bufferless, non-blocking interconnecting network emulate a buffered crossbar.

19. The switch of claim 18, wherein the scheduling controller is further configured to:
 schedule the transfer of the fixed-size data packets from the switch fabric to the external output buffer.

20. The method fabric of claim 18, wherein each of the input buffers is at least twice the size of each of the output buffers.

\* \* \* \* \*